United States Patent [19]
Shah

[11] Patent Number: 5,955,809
[45] Date of Patent: Sep. 21, 1999

[54] PERMANENT MAGNET GENERATOR WITH AUXILIARY WINDING

[75] Inventor: Mahesh J. Shah, Rockford, Ill.

[73] Assignee: Intellectual Property Law Department Sundstrand Corporation, Rockford, Ill.

[21] Appl. No.: 08/289,144

[22] Filed: Aug. 11, 1994

Related U.S. Application Data

[63] Continuation of application No. 07/931,168, Aug. 17, 1992, abandoned.

[51] Int. Cl.$^6$ ............................................. H02K 1/00
[52] U.S. Cl. .................. 310/198; 310/112; 310/114; 310/154; 310/156; 310/168; 310/184
[58] Field of Search ........................... 310/112, 114, 310/198, 268, 184, 154, 156, 261, 254, 152; 322/90

[56] References Cited

U.S. PATENT DOCUMENTS

| | | | |
|---|---|---|---|
| 1,144,012 | 6/1915 | Walton . | |
| 2,500,730 | 3/1950 | Yonkers | 171/252 |
| 2,784,332 | 3/1957 | Kober | 310/191 |
| 2,824,275 | 2/1958 | Kober | 322/27 |
| 2,831,156 | 4/1958 | Mathews, Jr. et al. | 322/24 |
| 2,837,710 | 6/1958 | Keller | 322/24 |
| 2,852,731 | 11/1958 | Heil | 322/24 |
| 2,877,645 | 5/1959 | Polasek | 322/31 |
| 2,886,762 | 5/1959 | Polasek | 322/24 |
| 3,056,914 | 10/1962 | Potter | 322/40 |
| 3,200,324 | 8/1965 | Wagner | 322/32 |
| 3,215,876 | 11/1965 | Nichols et al. | 310/156 |
| 3,233,133 | 2/1966 | Kober | 310/191 |
| 3,242,365 | 3/1966 | Kober | 310/268 |
| 3,459,980 | 8/1969 | Coroller | 310/114 |
| 3,483,463 | 12/1969 | Smith | 322/29 |
| 3,713,015 | 1/1973 | Frister | 322/28 |
| 4,051,423 | 9/1977 | Touchton et al. | 318/611 |
| 4,087,698 | 5/1978 | Myers | 307/84 |
| 4,228,391 | 10/1980 | Owen | 322/35 |
| 4,305,031 | 12/1981 | Wharton | 322/29 |
| 4,371,801 | 2/1983 | Richter | 310/156 |
| 4,547,714 | 10/1985 | Muller | 310/254 |
| 4,641,080 | 2/1987 | Glennon et al. | 322/49 |
| 4,663,581 | 5/1987 | Glennon | 322/52 |
| 4,704,552 | 11/1987 | Masterman | 310/148 |
| 4,728,841 | 3/1988 | Sugden | 310/114 |
| 4,743,777 | 5/1988 | Shilling et al. | 290/46 |
| 4,754,154 | 6/1988 | Motodate | 290/46 |
| 4,786,852 | 11/1988 | Cook | 322/10 |
| 4,797,602 | 1/1989 | West | 322/10 |
| 4,817,461 | 4/1989 | Iseman | 74/720 |
| 4,862,009 | 8/1989 | King | 290/22 |
| 4,868,406 | 9/1989 | Glennon et al. | 290/4 R |
| 4,879,484 | 11/1989 | Huss | 310/114 |
| 4,882,513 | 11/1989 | Flygare et al. | 310/114 |
| 4,900,965 | 2/1990 | Fisher | 310/216 |
| 4,939,399 | 7/1990 | Oh | 310/184 |
| 4,947,100 | 8/1990 | Dhyanchand et al. | 322/10 |
| 4,968,926 | 11/1990 | Dhyanchand | 322/10 |
| 4,996,457 | 2/1991 | Hawsey et al. | 310/268 |
| 5,001,412 | 3/1991 | Carter et al. | 322/10 |
| 5,013,929 | 5/1991 | Dhyanchand | 290/31 |
| 5,015,941 | 5/1991 | Dhyanchand | 322/10 |
| 5,019,766 | 5/1991 | Hsu | 310/184 |
| 5,021,698 | 6/1991 | Pullen et al. | 310/156 |
| 5,055,700 | 10/1991 | Dhyanchand | 290/31 |
| 5,068,590 | 11/1991 | Glennon et al. | 322/10 |
| 5,122,705 | 6/1992 | Kusase | 310/180 |
| 5,177,391 | 1/1993 | Kusase | 310/114 |
| 5,212,419 | 5/1993 | Fisher | 310/254 |
| 5,245,238 | 9/1993 | Lynch et al. | 310/268 |

FOREIGN PATENT DOCUMENTS 2007310  1/1970  France .

*Primary Examiner*—R. Skudy
*Attorney, Agent, or Firm*—Sundstrand Corporation

[57] ABSTRACT

An improvement in a generator having a rotor, a stator, a magnetic field structure disposed on one of the rotor and the stator and an armature winding disposed on the other end of the rotor and the stator wherein the armature winding is disposed in a useful flux path comprises an additional armature winding disposed in a leakage flux path wherein auxiliary power is developed by the additional armature winding for one or more electrical loads.

25 Claims, 4 Drawing Sheets

PERMANENT MAGNET GENERATOR WITH AUXILIARY WINDING

This is a continuation of U.S. application Ser. No. 07/931,168, filed Aug. 17, 1992, now abandoned.

TECHNICAL FIELD

The present invention relates generally to generators, and more particularly to a permanent magnet generator.

BACKGROUND ART

In prior aircraft power generating systems, the output power produced by a brushless, synchronous generator is supplied to an electrical power converter which converts the variable-frequency AC output of the generator into fixed frequency power. The power converter, as well as other devices used in the power generating system, such as an exciter current regulator, require control or operating power. In the past, this has been supplied by a relatively small auxiliary permanent magnet generator (PMG) which typically formed a part of the brushless, synchronous generator.

Synchronous generators of the foregoing type have successfully been used in many aerospace and aircraft installations. In such installations, however, system size and weight must be kept to a minimum. Recently, advances in magnetic materials have resulted in the design of high power permanent magnet generators which are capable of the high power levels required in aerospace and aircraft installations and which are small and light in weight. Axial gap PMG's, i.e. those where the magnetic flux developed by the permanent magnet is directed in an axial direction, have a high power density and thus can be made smaller and lighter than conventional radial gap PMG's of similar load capacity. Therefore, an overall savings in size and weight can be realized. However, the need for control power for the power converter connected to the PMG remains, and hence some provision must be made to supply this power requirement.

Hawsey, et al., U.S. Pat. No. 4,996,457 discloses a high speed permanent magnet axial gap alternator. First and second permanent magnet structures are carried by a rotor and are disposed axially side-by-side and are separated by a material providing magnetic isolation therebetween. First and second stators carrying first and second windings, respectively, are disposed adjacent the first and second magnets. Rotation of the rotor causes flux lines developed by the magnets to cut the windings in the stators, thereby inducing voltages therein. The magnetic isolation between the rotor magnets prevents one load connected to one of the windings from affecting another load connected to the other winding.

Nichols, et al., U.S. Pat. No. 3,215,876 discloses a generator unit including first and second permanent magnet rotor structures disposed on opposite sides of a stator and an armature winding wound on the stator wherein the armature winding is disposed in a useful path and in a leakage flux path. All of the flux developed by the magnetic structures is thus available for developing power for a load connected to the generator output.

Richter, U.S. Pat. No. 4,371,801 and Pullen, et al., U.S. Pat. No. 5,021,698 disclose axial gap permanent magnetic generators having multiple rotors and multiple stators. In the case of the Richter device, the stator windings are connected in series and the placement of a portion of the stator windings may be varied relative to the other stator windings to achieve output voltage regulation.

Other types of axial gap dual permanent magnetic generators (DPMG's) are disclosed in Lynch, et al., U.S. Pat. No. 5,245,238, entitled "Axial Gap Dual Permanent Magnet Generator" and assigned to the assignee of the instant application, the disclosure of which is hereby incorporated by reference herein. This application discloses DPMG's having two relatively movable rotors each carrying a plurality of permanent magnets disposed adjacent one or two fixed stator windings. The positions of the rotor magnets relative to one another is adjusted to vary the output voltage of the generator.

SUMMARY OF THE INVENTION

In accordance with the present invention, a generator is adapted to utilize leakage flux to supply control power for electrical components.

More particularly, an improvement in a generator having a rotor, a stator, a magnetic field structure disposed on one of the rotor and the stator wherein the magnetic field structure develops useful magnetic flux in a flux path and a leakage flux in a second flux path and an armature winding disposed on the other of the rotor and the stator in the first flux path comprises an additional armature winding disposed in the second flux path. The second armature winding and the magnetic field structure are relatively movable and the first-named armature winding and the additional armature winding are not directly connected to one another.

Preferably, the magnetic field structure is disposed on the rotor, the first-named armature winding is disposed on the stator and the additional armature winding is disposed on the same or a different stator. In an alternate embodiment, the magnetic field structure is disposed on the stator, the first-named armature winding is disposed on the rotor and the additional armature winding is disposed on the same or a different rotor.

Also in accordance with the preferred embodiment, the magnetic field structure comprises a permanent magnet wherein the permanent magnet preferably includes circumferentially directed poles and the useful flux and the leakage flux are axially directed.

In accordance with a further embodiment, the magnetic field structure includes an additional permanent magnet developing flux linking the first armature winding wherein the additional permanent magnet includes circumferentially directed poles and wherein the flux developed by the additional permanent magnet is axially directed. Further in accordance with this embodiment, the first-named armature winding is disposed on the stator, the first-named permanent magnet is disposed on the rotor and the additional permanent magnet is disposed on an additional rotor. Also, in accordance with one specific embodiment, the first-named rotor and the additional rotor are disposed on opposite sides of the stator. In accordance with a further specific embodiment, the first-named rotor and the additional rotor are adjacent to one another and are disposed on a same side of the stator. In yet another specific embodiment, the second armature winding is disposed on an additional stator and at least one of the first-named rotor and the additional rotor is disposed between the first-named stator and the additional stator.

According to another aspect of the present invention, a generator includes a rotor, a stator, a first armature winding disposed on one of the rotor and stator and traversing a path extending substantially 360° and a magnetic field structure disposed on the other of the rotor stator. The magnetic field structure develops magnetic flux and a first portion of the magnetic flux links the first armature winding and a second portion of the magnetic flux does not link the first armature winding. A second armature winding is disposed adjacent the magnetic field structure and traverses a path extending substantially less than 360° such that the second portion of the magnetic flux links the second armature winding and wherein the second armature winding and the magnetic field structure are relatively movable.

According to yet another aspect of the present invention, a generator includes a rotor connected to a rotatable drive shaft for rotation therewith, a circumferentially oriented permanent magnet disposed on the rotor having two poles producing an axial useful magnetic flux field in a first flux path and an axial leakage magnetic flux field in a second flux path and a first stator having a first armature winding disposed in the first flux path. A second stator is fixed with respect to the first stator and has a second armature winding disposed in the second flux path.

The present invention is capable of supplying control power to electrical components and has particular utility in a power conversion system of the type described above.

DESCRIPTION OF THE PREFERRED EMBODIMENTS

Figure 1:
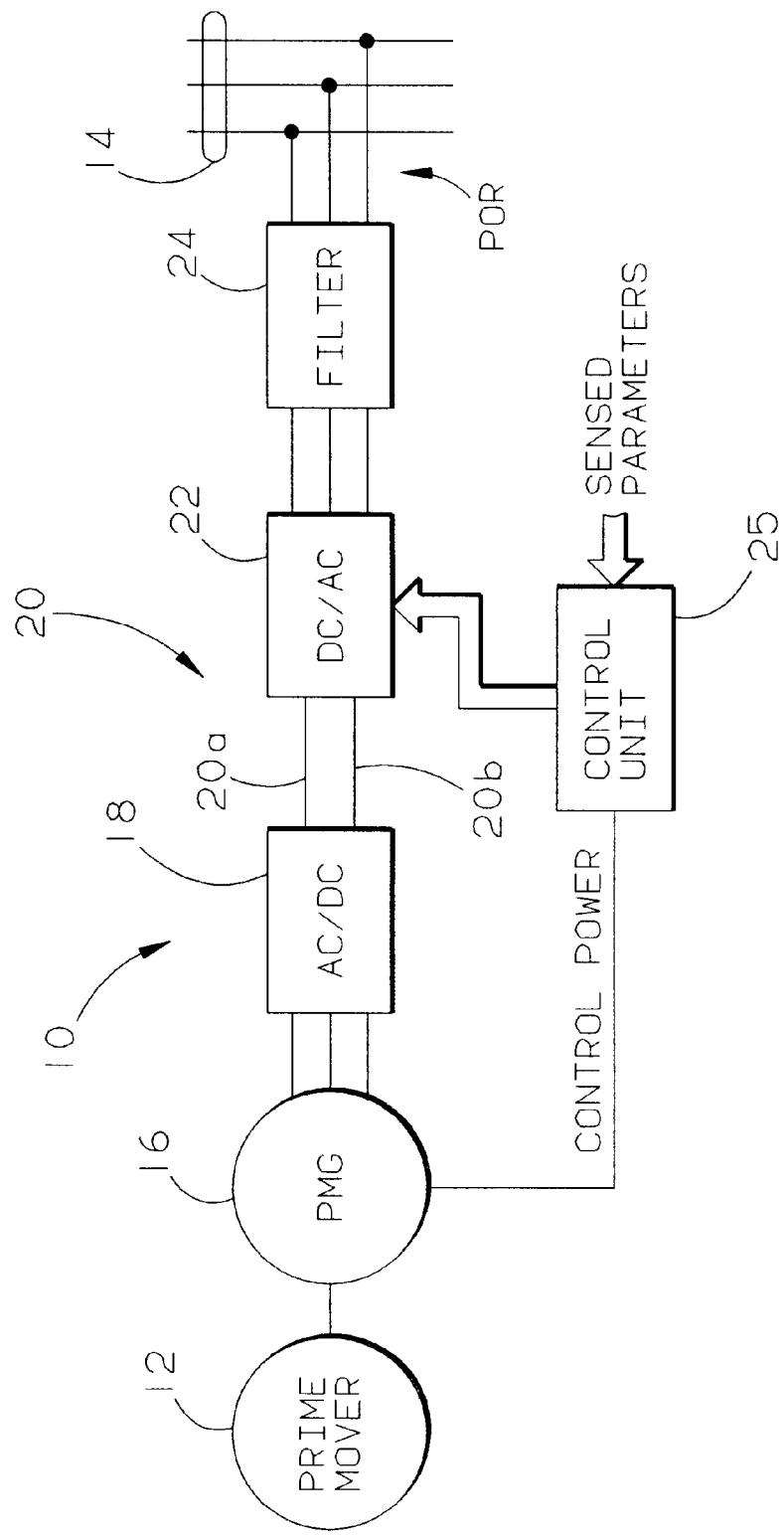
FIG. 1 comprises a block diagram of a power generating system incorporating the generator of the present invention.

Referring now to FIG. 1, a variable-speed, constant-frequency (VSCF) power generating system 10 receives motive power developed by a prime mover 12 and develops constant-frequency power which is delivered to a load bus 14 for use by one or more loads (not shown). The VSCF system 10 includes a permanent magnet generator (PMG) 16 according to the present invention which develops single or polyphase (preferably three-phase) variable-frequency AC power which is rectified by an AC/DC converter 18 of conventional construction. The DC power is supplied on a DC link 20 comprising first and second DC link conductors 20a, 20b which are in turn coupled to a DC/AC power converter or inverter 22. The inverter 22 converts the DC power into constant-frequency AC power which is filtered by an optional filter 24 and supplied to the load bus 14.

If necessary or desirable, a neutral forming transformer (NFT) may be supplied to derive a neutral voltage from the three-phase voltages developed by the inverter 22.

The inverter 22 includes power switches (not shown) which are operated by a control unit 25 which is responsive to one or more sensed parameters detected at a point of regulation (POR) at or near the load bus 14. The control unit receives control power from the PMG 16 wherein the control power is developed in the fashion noted in greater detail hereinafter.

It should be noted that the PMG 16 of the present invention need not be used in the VSCF system 10, but instead may be used either alone or with other components in other types of generating systems, as desired.

Figure 2:
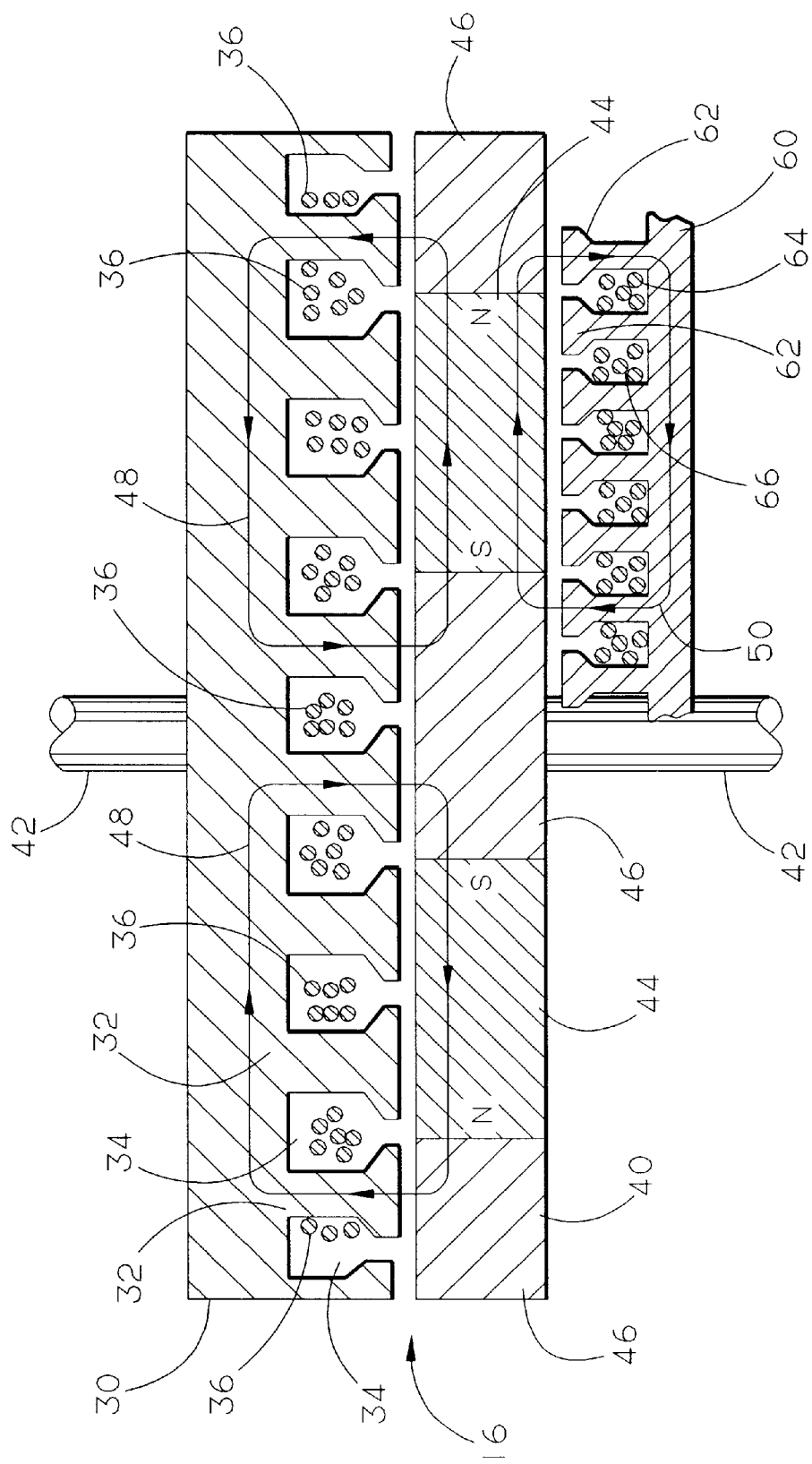
FIGS. 2–4 are diagrammatic elevational views of the rotor(s) and stators of various embodiments of the present invention.

Referring now to FIG. 2, a first embodiment of the PMG 16 according to the present invention is shown. The PMG 16 includes a first or main stator 30 having a plurality of teeth 32 defining slots 34 therein receiving a set of polyphase armature windings 36 shown diagrammatically in the Figure. The main stator 30 is disposed adjacent a rotor 40 coupled to a motive power shaft 42. The rotor 40 includes a plurality of permanent magnets 44 separated by pole pieces 46. The permanent magnets 44 are preferably circumferentially magnetized, although the magnets 44 may be axially or radially magnetized, if desired. Also, the number of permanent magnets 44 disposed on the rotor 40 may be varied to suit the particular application, as desired. The pole pieces 46, as is conventional, are fabricated of magnetically permeable material which may be laminated to minimize the generation of eddy currents therein.

The permanent magnets 44 develop flux in first flux paths 48 linking the armature windings 36. This flux, also called useful flux, cuts the armature windings 36 as the rotor 40 rotates relative to the main stator 30 and produces electrical power in the windings 36, as is conventional.

The permanent magnets 44 also develop a second flux portion, also called leakage flux, in a second flux path 50. In conventional designs, this leakage flux does not link the armature windings 36 and thus does not contribute to the overall output of the PMG 16. According to this embodiment of the present invention, the leakage flux is utilized by providing an auxiliary or second stator 60 including teeth 62 defining slots 64 therebetween wherein an auxiliary or second armature winding 66 is disposed within the slots 64 in the second flux path 50. As can be seen in FIG. 2, the second or auxiliary armature winding 66 is physically separated from, and electrically isolated from, the main armature windings 36. Preferably, although not necessarily, while the main armature windings 36 traverse a path substantially equal to 360° about the stator 30, the auxiliary armature winding 66 traverses a path substantially less than 360° and preferably less than 180°. In the preferred embodiment, the control power required by the control unit 25 of FIG. 1 is of a relatively low level, and hence the ampere turns of the auxiliary winding 66 may be made relatively small. This, in turn, permits the auxiliary stator 60 to be made relatively small and light in weight so that the size and weight of the PMG 16 are not significantly increased.

Of course, the ampere turns of the auxiliary armature winding 66 and the size of the auxiliary stator 60 may be adjusted as needed for the particular application. Desirably, these values are kept as low as possible so that size and weight are not unduly increased.

By utilizing the otherwise wasted leakage flux developed by the permanent magnets 44, control power for the control unit 25 of FIG. 1 is developed, in turn obviating the need for a separate generator driven by the prime mover 12 or another source of power.

Figure 3:
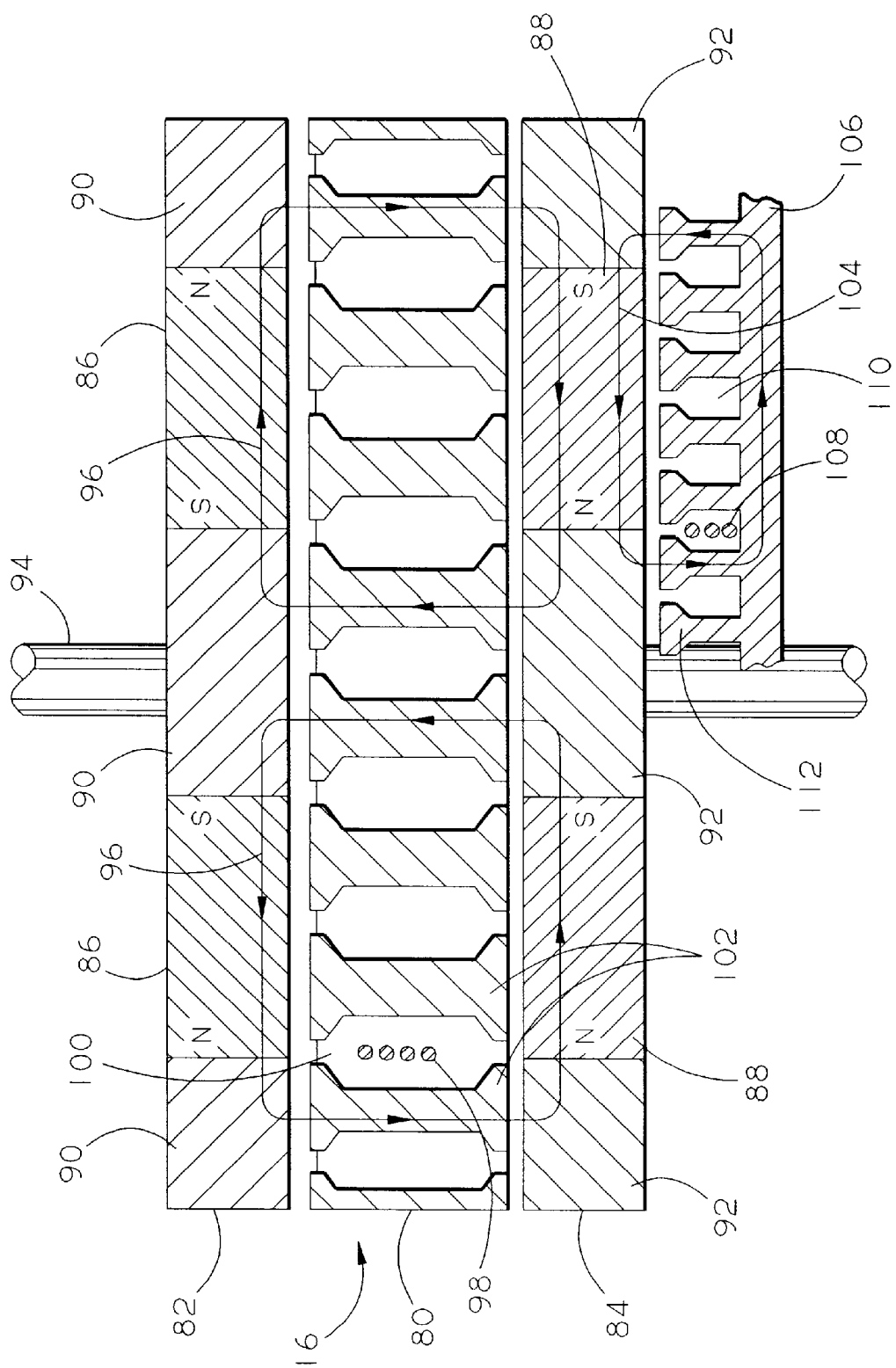

FIG. 3 illustrates an alternative embodiment of the present invention wherein the PMG 16 comprises a main stator 80 disposed between first and second rotors 82, 84. Again, preferably, although not necessarily, the rotors 82, 84 include circumferentially magnetized permanent magnets 86, 88, respectively, separated by pole pieces 90, 92, respectively. The rotors 82, 84 are individually coupled to a motive power shaft 94 and, in the preferred embodiment, are movable relative to one another to vary the magnitude of magnetic flux developed in first flux paths 96. The flux developed in the paths 96 is considered the useful flux developed by the permanent magnets 86, 88, inasmuch as such flux links armature windings 98 diagrammatically shown as being wound in slots 100 formed by teeth 102 of the main stator 80. As should be evident from the foregoing description, the generator 16 is termed a dual permanent magnet generator (DPMG) owing to the dual rotors 82, 84.

It should be noted that elements required to regulate the output voltage of the generator 16 shown in FIG. 3 by varying the relative positions of the rotors 82, 84 are not shown for the purpose of clarity.

The permanent magnets 88, and to a lesser extent the permanent magnets 86, develop leakage flux in a flux path 104. This leakage flux does not link the armature windings 98. As with the previous embodiment, an auxiliary or second stator 106, identical to the stator 60, is disposed adjacent the rotor 84 or, alternatively, adjacent the rotor 82. As was noted in connection with the stator 60, the stator 106 includes an auxiliary armature winding 108 disposed in slots 110 formed by teeth 112. This auxiliary armature winding 108, as can be seen from the figure, is physically separate, and electrically isolated, from the main armature winding 98. The stator 106 is fixed with respect to the stator 80 and the rotors 82, 84 are relatively movable with respect to the stators 80, 106 such that the flux developed in the flux paths 96, 104 cuts the armature windings 98, 108 to in turn induce main and auxiliary control power therein.

Figure 4:
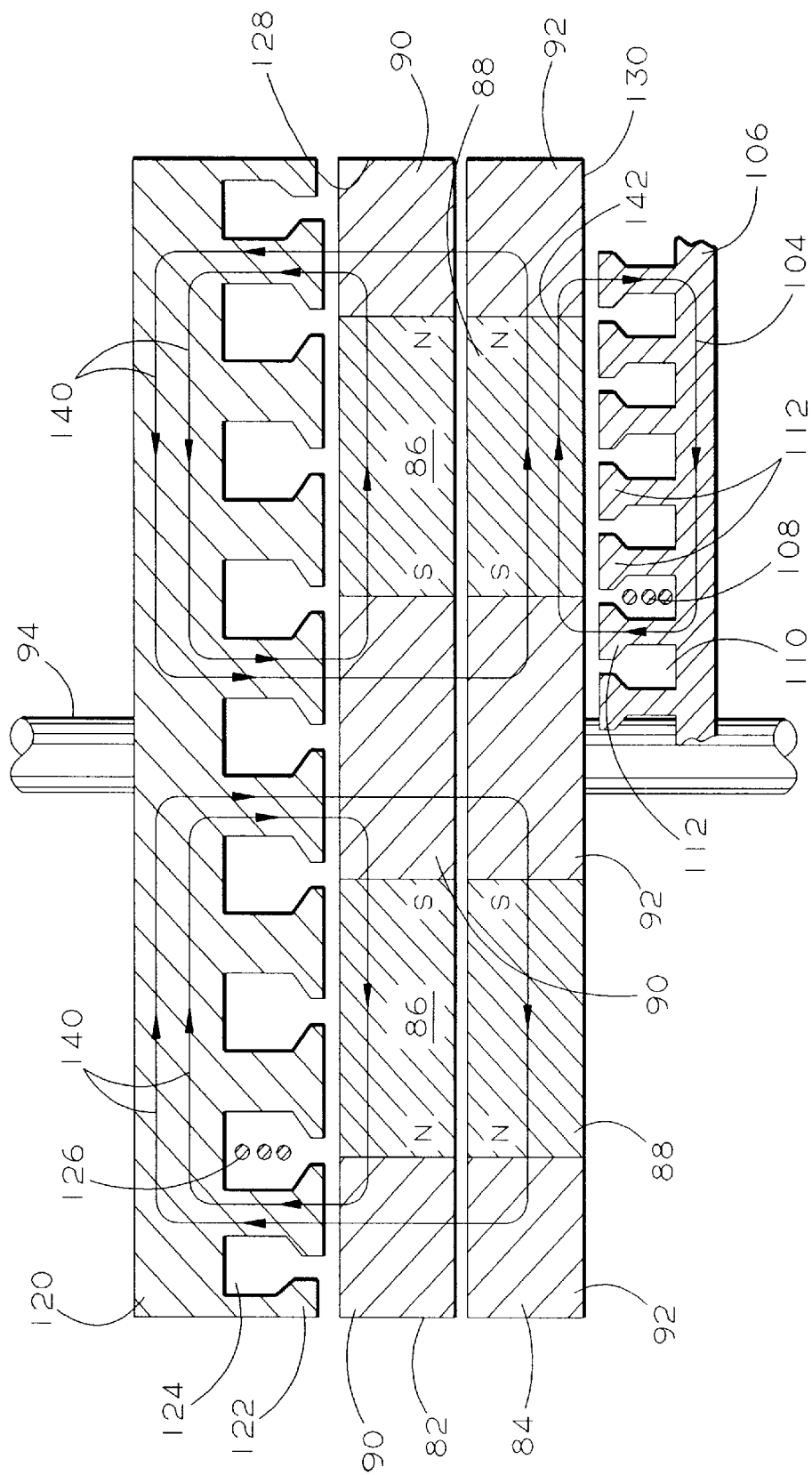

FIG. 4 illustrates yet another embodiment of the present invention wherein elements common between FIGS. 3 and 4 are assigned like reference numerals. In the embodiment of FIG. 4, the rotors 82, 84 are disposed adjacent one another. The stator 80 of FIG. 3 is replaced by a stator 120 having a series of teeth 122 again defining slots 124 therebetween. A set of main polyphase armature windings 126 are diagrammatically shown as being disposed in the slots 124. The stator 120 is disposed adjacent a first side 128 of the rotors 82, 84 while the stator 106 is disposed adjacent a second side 130 of the rotors 82, 84, with the armature windings 126, 108 being physically separated, and electrically isolated, from each other.

Similar to the embodiment of FIG. 3, the rotors 82, 84 are relatively movable to vary the flux flowing in first flux paths 140. These first flux paths link the armature windings 126 and, when the rotors 82, 84 rotate relative to the armature windings 126, the flux flowing in the paths 140 cuts the armature windings 126 and produces electrical power therein. Leakage flux flowing in a leakage flux path 142 likewise cuts the armature windings 108 disposed in the stator 106 to produce the control power for the control unit of FIG. 1. This leakage flux does not link the armature windings 126.

The circumferential magnetization of the magnets shown in FIGS. 2–4 produces axially directed flux fields. It has been found that this particular arrangement results in a generator which is especially compact and light in weight. It should be noted, however, that the permanent magnets may be oriented such that the flux direction may be other than axial, if desired.

Also, while permanent magnets have been shown as magnetic field structures for the generators of FIGS. 2–4, it should be noted that the inventive concepts disclosed herein are not limited to use with permanent magnet machines. Instead, magnetic field structures comprising windings receiving electrical power may instead be used. Also, the present invention is not limited to use with those machines illustrated in FIGS. 2–4 wherein the rotors carry the magnetic field structures and the stators carry the armature windings. Instead, the magnetic field structures may be disposed on one or more stators and the main and auxiliary armature windings may be disposed on one or more rotors suitably positioned with respect to the stators and relatively movable therewith.

The advantages of the present invention in the VSCF power generating system 10 shown in FIG. 1 can best be understood by considering the design of a previous system utilizing a brushless, synchronous generator. In such a system, the output voltage is regulated and protection against differential faults is accomplished by controlling the excitation of the generator. However, for typical aircraft systems, this is a heavy and expensive electrical generating system inasmuch as the brushless, synchronous generator consists of a main polyphase wound field generator, an exciter and an auxiliary PMG to provide electrical power to the exciter and to the control unit. The brushless, synchronous generator has several other disadvantages such as relatively heavy weight, presence of rotating windings and diode assemblies that reduce system reliability and efficiency, increased component count and higher overhung moment.

Axial gap DPMG's such as those shown in FIGS. 3 and 4 offer potential weight reduction of 20% over conventional brushless, synchronous wound field generators of like power rating. A DPMG of this type accomplishes output voltage regulation and can provide protection against differential faults by adjusting the phase relationship of the two rotors (or two stators if they are relatively movable). In addition to a substantial weight reduction as compared with brushless, synchronous generators, the axial gap DPMG offers the benefits of overall size reduction, higher efficiency, inherent ruggedness, higher reliability, simplicity, reduction in overhung moment, and the absence of rotating windings and diodes. By the provision of an auxiliary armature winding in the fashion noted herein, electric power is available for the control unit without the need for a separate permanent magnet rotor to provide flux for the armature windings. Thus, the addition of the small segment of stator 60 or 106 provides all of the performance characteristics of an auxiliary permanent magnet generator with the weight and axial length savings of the axial permanent magnet generator approach.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. In a generator having a rotor, a stator, a magnetic field structure disposed on one of the rotor and the stator wherein the magnetic field structure develops useful magnetic flux in a first flux path and leakage flux in a second flux path and a first armature winding disposed on another of the rotor and the stator in the first flux path, the improvement comprising:

an additional armature winding disposed in the second flux path wherein the additional armature winding and the magnetic field structure are relatively movable and wherein the first armature winding and the additional armature winding are physically separated from one another.

2. The improvement of claim 1, wherein the magnetic field structure is disposed on the rotor, the first armature winding is disposed on the stator and the additional armature winding is disposed on an additional stator.

3. The improvement of claim 1, wherein the magnetic field structure comprises a first permanent magnet.

4. The improvement of claim 3, wherein the permanent magnet includes circumferentially directed poles and wherein the useful magnetic flux and the leakage flux are axially directed.

5. The improvement of claim 3, wherein the magnetic field structure includes an additional permanent magnet developing flux linking the first armature winding wherein the additional permanent magnet includes circumferentially directed poles and wherein the flux developed by the additional permanent magnet is axially directed.

6. The improvement of claim 5, wherein the first armature winding is disposed on the stator and wherein the first permanent magnet is disposed on the rotor and the additional permanent magnet is disposed on an additional rotor.

7. The improvement of claim 6, wherein the rotors are disposed on opposite sides of the stator.

8. The improvement of claim 6, wherein the rotors are adjacent to one another.

9. In a generator having a rotor, a stator, a magnetic field structure disposed on one of the rotor and the stator wherein the magnetic field structure develops useful magnetic flux in a first flux path and leakage flux in a second flux path and a first armature winding disposed on another of the rotor and the stator in the first flux path, the improvement comprising:

a second armature winding disposed in the second flux path wherein the second armature winding and the magnetic field structure are relatively movable and wherein the first armature winding and the second armature winding are physically separated from one another;

wherein the magnetic field structure comprises a first permanent magnet and a second permanent magnet which develops flux linking the first armature winding, wherein the second permanent magnet includes circumferentially directed poles and the flux developed by the second permanent magnet is axially directed, wherein the first armature winding is disposed on the stator, the first permanent magnet is disposed on the rotor and the second permanent magnet is disposed on a second rotor and wherein the second armature winding is disposed on an additional stator and at least one of the rotors is disposed between the stators.

10. A generator, comprising:

a rotor;

a stator;

a first armature winding disposed on one of the rotor and the stator and traversing a path extending substantially 360 degrees;

a magnetic field structure disposed on another of the rotor and the stator wherein the magnetic field structure develops magnetic flux and wherein a first portion of the magnetic flux links the first armature winding and a second portion of the magnetic flux does not link the first armature winding; and a second armature winding disposed adjacent the magnetic field structure and traversing a path extending substantially less than 360 degrees such that the second portion of the magnetic flux links the second armature winding and wherein the second armature winding and the magnetic field structure are relatively movable.

11. The generator of claim 10, wherein the magnetic field structure comprises a permanent magnet disposed on the rotor.

12. The generator of claim 10, wherein the first armature winding is disposed on the stator and the second armature winding is disposed on an additional stator.

13. A generator, comprising:

a rotor;

a stator;

a first armature winding disposed on one of the rotor and the stator and traversing a path extending substantially 360 degrees;

a magnetic field structure disposed on another of the rotor and the stator wherein the magnetic field structure develops magnetic flux and wherein a first portion of the magnetic flux links the first armature winding and a second portion of the magnetic flux does not link the first armature winding; and a second armature winding disposed adjacent the magnetic field structure and traversing a path extending substantially less than 360 degrees such that the second portion of the magnetic flux links the second armature winding and wherein the second armature winding and the magnetic field structure are relatively movable; and wherein the magnetic field structure includes a first permanent magnet disposed on the rotor and a second permanent magnet disposed on an additional rotor and wherein the first armature winding is disposed on the stator and the second armature winding is disposed on an additional stator.

14. The generator of claim 13, wherein the rotors are disposed on opposite sides of one of the stators.

15. The generator of claim 13, wherein the rotors are adjacent to one another.

16. The generator of claim 13, wherein the permanent magnets include circumferentially directed poles and wherein the first and second portions of the magnetic flux are axially directed.

17. A generator, comprising:

a rotor connected to a rotatable drive shaft for rotation therewith;

a circumferentially oriented permanent magnet disposed on the rotor having two poles producing an axial useful magnetic flux field in a first flux path and an axial leakage magnetic flux field in a second flux path;

a first stator having a first armature winding disposed in the first flux path; and a second stator fixed with respect to the first stator and having a second armature winding which is physically separated from the first armature winding and which is disposed in the second flux path.

18. The permanent magnet generator of claim 17, wherein the useful magnetic flux field produced by the permanent magnet is substantially greater than the leakage magnetic flux field produced by the permanent magnet.

19. A generator, comprising:

a rotor connected to a rotatable drive shaft for rotation therewith;

a circumferentially oriented permanent magnet disposed on the rotor having two poles producing an axial useful magnetic flux field in a first flux path and an axial leakage magnetic flux field in a second flux path;

a first stator having a first armature winding disposed in the first flux path; and a second stator fixed with respect to the first stator and having a second armature winding which is physically separated from the first armature winding and which is disposed in the second flux path; and an additional permanent magnet disposed on an additional rotor.

20. The generator of claim 19, wherein the rotors are disposed on opposite sides of one of the stators.

21. The generator of claim 19, wherein the rotors are adjacent to one another and one of the stators is disposed on a first side of the rotors and wherein another of the stators is disposed on a second side of the rotors.

22. In a generator having a rotor, a stator, a magnetic field structure disposed on one of the rotor and the stator wherein the magnetic field structure develops useful magnetic flux in a first flux path and leakage flux in a second flux path and a first armature winding disposed on another of the rotor and the stator in the first flux path, the improvement comprising:

an additional armature winding disposed in the second flux path wherein the additional armature winding and the magnetic field structure are relatively movable and wherein the first armature winding and the additional armature winding are electrically isolated from one another.

23. In a generator having a rotor, a stator, a magnetic field structure disposed on one of the rotor and the stator wherein the magnetic field structure develops useful magnetic flux in a first flux path and leakage flux in a second flux path and a first armature winding disposed on another of the rotor and the stator in the first flux path, the improvement comprising:

a second armature winding disposed in the second flux path wherein the second armature winding and the magnetic field structure are relatively movable and wherein the first armature winding and the second armature winding are electrically isolated from one another;

wherein the magnetic field structure comprises a first permanent magnet and a second permanent magnet which develops flux linking the first armature winding, wherein the second permanent magnet includes circumferentially directed poles and the flux developed by the second permanent magnet is axially directed, wherein the first armature winding is disposed on the stator, the first permanent magnet is disposed on the rotor and the second permanent magnet is disposed on a second rotor and wherein the second armature winding is disposed on an additional stator and at least one of the rotors is disposed between the stators.

24. A generator, comprising:

a rotor connected to a rotatable drive shaft for rotation therewith;

a circumferentially oriented permanent magnet disposed on the rotor having two poles producing an axial useful magnetic flux field in a first flux path and an axial leakage magnetic flux field in a second flux path;

a first stator having a first armature winding disposed in the first flux path; and a second stator fixed with respect to the first stator and having a second armature winding which is electrically isolated from the first armature winding and which is disposed in the second flux path.

25. A generator, comprising:

a rotor connected to a rotatable drive shaft for rotation therewith;

a circumferentially oriented permanent magnet disposed on the rotor having two poles producing an axial useful magnetic flux field in a first flux path and an axial leakage magnetic flux field in a second flux path;

a first stator having a first armature winding disposed in the first flux path; and a second stator fixed with respect to the first stator and having a second armature winding which is electrically isolated from the first armature winding and which is disposed in the second flux path; and an additional permanent magnet disposed on an additional rotor.

* * * * *